United States Patent [19]
Carman, Jr. et al.

[11] 3,757,249
[45] Sept. 4, 1973

[54] Q-SWITCHED-MODE-LOCKED LASER OSCILLATOR

[75] Inventors: Robert L. Carman, Jr.; Lloyd L. Steinmetz, both of Livermore; Bertram C. Johnson, Jr., Palo Alto, all of Calif.

[73] Assignee: The United States of America as represented by the United States Atomic Energy Commission, Washington, D.C.

[22] Filed: Feb. 15, 1972

[21] Appl. No.: 226,471

[52] U.S. Cl. .............................................. 331/94.5
[51] Int. Cl. ............................................. H01s 3/11
[58] Field of Search .................... 331/94.5; 350/150, 350/157, 160

[56] References Cited
UNITED STATES PATENTS
3,521,069  7/1970  DeMaria et al. .................... 331/94.5
3,168,611  2/1965  Strauss ............................... 350/150
3,531,179  9/1970  Jaffe et al. .......................... 350/150

OTHER PUBLICATIONS
Roess, Ruby Laser With Modes–Selective Etalon Reflector, Proc. IEEE, V52, No. 2 (Feb. 1964) pp. 196 and 197

Primary Examiner—William L. Sikes
Attorney—Roland A. Anderson

[57] ABSTRACT

A laser oscillator for producing relatively long duration, Q-switched or Q-switched and mode-locked bandwidth-limited pulses. The oscillator is self-driven, wherein a large optical noise pulse of controllable duration is allowed to buildup by means of controlled bandwidth feedback. Combined with a synchronized pulse-switching means external to the oscillator cavity, a bandwidth-limited "tunable" pulse duration is achievable ranging from about 0.25 nsec to greater than 100 nsecs. An embodiment of the oscillator includes a gain medium, a Pockel cell, a quarterwave plate, and a polarizer, all within an optical cavity defined by two multiple-face resonant-reflecting etalons, the optical cavity being switched by shorting a biasing potential across the Pockel cell from its halfwave retardation value to ground.

9 Claims, 10 Drawing Figures

Q-SWITCHED-MODE-LOCKED LASER OSCILLATOR

BACKGROUND OF THE INVENTION

The invention described herein was made in the course of, or under, Contract No. W-7405-ENG-48 with the United States Atomic Energy Commission.

This invention relates to laser oscillators, particularly to Q-switched laser oscillators, and more particularly to Q-switched, mode-locked laser oscillators for directly producing bandwidth-limited pulses.

Bandwidth-limited laser pulses, due to their lack of frequency or amplitude modulation, are highly desirable for many applications in the field of laser technology, and considerable efforts have been devoted to obtaining and investigating such pulses. Q-switched and mode-locked lasers have been developed in the prior art as well as inner cavity switching techniques as described in U.S. Pat. Nos. 3,521,069 and 3,597,695, the latter being coinvented by one of the coinventors of this invention and assigned to the same assignee. However, the bandwidth-limited laser pulses are more ideal for diagnostics, communication, amplification, experimentation, and many other applications of light pulses.

SUMMARY OF THE INVENTION

This invention is a laser oscillator for producing relatively long duration Q-switched or Q-switched/mode-locked bandwidth-limited pulses. The oscillator is sef-driven, wherein a large pulse of optical noise of controllable duration is allowed to buildup by means of controlled bandwidth feedback in an optical cavity. A synchronized, pulsed switching means external to the oscillator cavity provides a system capable of producing bandwidth-limited pulses of a "tunable" duration ranging between 0.25 nsec to > 100 nsec.

Therefore, it is an object of this invention to provide a laser oscillator.

A further object of the invention is to provide a laser oscillator capable of producing bandwidth-limited pulses.

Another object of the invention is to provide a laser oscillator capable of directly producing Q-switched/mode-locked, bandwidth-limited pulses with durations of 0.25 to 100 nanoseconds.

Another object of the invention is to provide a laser oscillator which operates as a self-driven optical resonator, whereby spontaneous emission noise in the cavity is gated, symmetrically in time, to a high Q state in the system and then allowed to buildup by means of controlled bandwidth feedback.

Other objects of the invention not specifically set forth above will become readily apparent from the following description and accompanying drawings.

DESCRIPTION OF THE INVENTION

Figure 1:
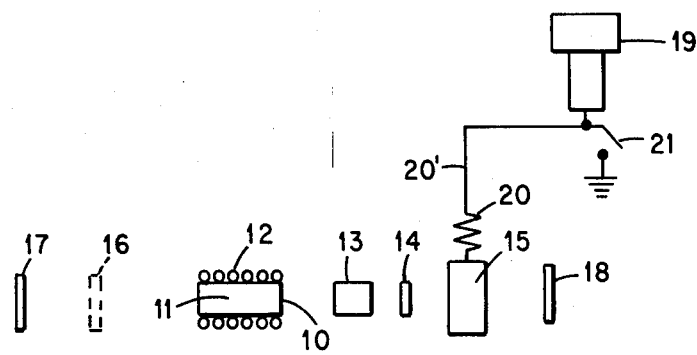
FIG. 1 is a schematic illustration of an embodiment of the inventive laser oscillator.

The invention is directed to a laser oscillator which is capable of directly producing Q-switched or Q-switched/mode-locked bandwidth-limited pulses with durations ranging between about 0.25 nsec to greater than 100 nsec. The oscillator operates as a self-driven optical resonator, whereby spontaneous emission noise in the cavity is gated, symmetrically in time, to a high Q state in the system and then allowed to buildup by means of controlled bandwidth feedback.

Prior to a detailed description of the oscillator and its operation a broad general description is set forth wherein the principle elements of the oscillator system are a gain medium such as Nd:YAG, a polarizer, a quarterwave plate, and a Pockel cell; all placed within an optical cavity defined by two multiple-face resonant-reflecting etalons. The polarizer, quarterwave plate, and Pockel cell (hereinafter referred to as the PQP) are situated between the gain medium and the highly reflecting rear etalon. The PQP elements are arranged such that the cavity is in a low Q (lossy) configuration when the Pockel cell is biased at either of its halfwave or its zero retardation voltage. With the Pockel cell biased initially at its halfwave value, the optical cavity is switched by shorting the bias voltage to ground while the gain medium is at its maximum inversion. As the Pockel cell retardation passes through the quarterwave value, the transmission of the PQP reaches a maximum and a noise pulse (spontaneous emission light) is allowed to pass through the rear of the cavity with minimal attenuation. Since the Pockel cell voltage is switched to zero in a few nanoseconds or less, and since the transmission characteristic of the PQP-etalon combination is symmetric in time, a large amplitude noise pulse whose spatial extent is less than the cavity length and whose envelope is symmetric about its intensity maximum is initiated in the cavity. The initial noise pulse is then permitted to oscillate by maintaining a cavity round trip gain for the gated pulse which is greater than unity when the cavity is in its residual low Q state (i.e., Pockel cell bias voltage at zero). The frequency content of the oscillating pulse is constrained by the narrowband feedback properties of the resonantly reflecting etalons, which will allow oscillation for only a few of the possible axial modes of the cavity.

The operation of the inventive system, as briefly described above and in greater detail hereinafter, relies on the combination of the fast, time symmetrical PQP switch and the narrowband frequency selecting elements in the cavity. This combination when incorporated with the control of inversion provides for independent determination of the time and frequency content of the pulse, hence making it possible to achieve bandwidth-limited pulses in this system over a narrow range of pulse durations.

As pointed out above, bandwidth-limited laser pulses, due to their lack of frequency or amplitude modulation, are desired in all fields of laser technology. A bandwidth-limited laser pulse may be generally defined as a light pulse having a bandwidth equal to the inverse of its time duration. Mathematically, a bandwidth-limited pulse occurs when the Fourier transform of the pulse intensity as a function of time $I(t)$ is identical in form to its intensity as a function of frequency, $I(w)$, i.e.,:

$$I(w) = \int_{-\infty}^{\infty} e^{iwt} I(t) dt \qquad (1)$$

The above relationship implies that bandwidth-limited laser pulses are neither frequency-modulated nor amplitude-modulated. Such bandwidth limited pulses are ideal for diagnostics, communication, amplification, experimentation, and many other applications of light pulses.

Referring now to the drawings, FIG. 1 schematically shows an embodiment of the inventive laser oscillator and comprises a vessel 10, constructed of suitable material such as aluminum or stainless steel, within which is located a gain medium 11, such as ruby, neodymium: YAG, neodymium: glass, $CO_2$, or organic dye such as rhodamine 6G, vessel 10 being surrounded by flashlamps 12, which for example may be of the helical type, a polarizing prism 13, constructed for example of calcite; a quarterwave retardation plate 14 of quartz, for example; a Pockel cell 15; a dye cell 16 may be provided to improve and/or stabilize mode-locking, but this element is optional and may be eliminated if desired; each of elements 10 through 16 being placed within an optical cavity defined by reflective means comprising two multiple-face, resonantly reflecting etalons 17 and 18. In general, front etalon 17 can consist of 2, 4, or 6 faces (1, 2 or 3 plates), where as rear etalon 18 can have eight faces (4 plates) in order to provide the desired frequency selection properties. It should also be noted that other frequency selecting elements may be employed in lieu of or in combination with the reflecting etalons, the only requirement being that the frequency bandwidth of the optical cavity be constrained in an appropriate manner. For example, the cavity may also be defined between two single surface reflective means (mirrors) with the additional frequency selection being provided by other means internal to the cavity. In addition, etalon 18 may be replaced by a highly dispersive grating.

The FIG. 1 embodiment of the inventive laser oscillator system also includes means 19, such as a current limited high voltage power source, for impressing an electrical potential across the Pockel cell 15, via a dropping resistor 20 and delay cable 20' and a high voltage switching means 21 connected to cable 20', such as a spark gap switching mechanism, for shorting the Pockel cell biasing potential to ground. The switching means 21 may, for example, generally be of the type illustrated in the above-referenced U.S. Pat. No. 3,597,695, issued Aug. 3, 1971.

Figure 2:
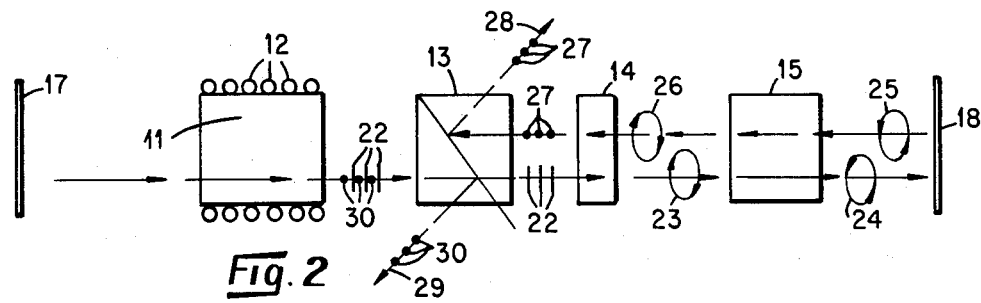
FIG. 2 schematically illustrates the light travel and polarization of en enlarged view of the optical cavity of the FIG. 1 apparatus with the Pockel cell biased at halfwave voltage.

FIG. 2 shows the polarization state of light transmitted by each element in the optical cavity of the FIG. 1 embodiment, with the Pockel cell 15 biased at its halfwave retardation voltage, and corresponding elements will be given like reference numerals. As shown, light from the gain medium 11, transmitted by polarizing prism 13, is linearly polarized in the plane of the sheet of paper indicated by the lines 22. The quarterwave plate 14 converts the linearly polarized light to circularly polarized light in a left circular (LC) direction, as indicated at 23. The Pockel cell 15 converts the light from the quarterwave plate 14 to a circular polarization in the right circular (RC) direction, as indicated at 24. Reflection from the etalon 18 converts the light to polarization in the LC direction, indicated at 25, which is converted back to polarization in the RC direction by Pockel cell 15, as indicated at 26. The quarterwave plate 14 converts the right hand circular polarized light from Pockel cell 15 to linearly polarized light perpendicular to the plane of the sheet of paper indicated by the dots 27 and the polarizing prism 13 reflects light out of the optical cavity, as indicated by arrow 28. While incident and reflected beams are colinear, the incident beam, indicated by arrow 29 and having a polarization perpendicular to the plane of sheet as indicated at 30, has been illustrated as being displaced in FIG. 2 for clarity. A portion of the linearly polarized light passes through polarizing prism 13 through the gain medium 11 and is reflected back through the optical cavity by etalon 17 in an oscillatory mode, as indicated by the line 22. While not shown flashlamps 12 are powered by appropriate power supply means conventional in the art.

Figure 3:
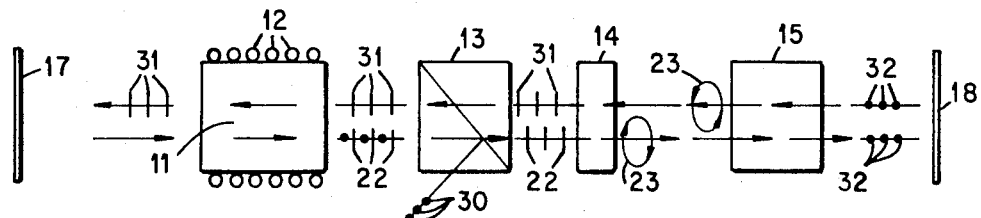
FIG. 3 schematically illustrates the light travel and polarization of an enlarged view of the optical cavity of the FIG. 1 apparatus with the Pockel cell biased at quarterwave voltage.

FIG. 3 shows the polarization state of light transmitted through each element in the optical cavity of the FIG. 1 embodiment, with the Pockel cell 15 biased at its quarterwave retardation voltage. As illustrated in FIG. 3, the pulse coming back to the polarizer 13 is linearly polarized in the plane of the sheet of paper, as indicated at 31, and is transmitted therethrough, through gain medium 11, and reflected by etalon 17 back through the optical cavity. Accordingly, with the Pockel cell 15 biased at its quarterwave potential, a light pulse can resonantly oscillate in the optical cavity. As in FIG. 2, an incident light beam 29 will be reflected out of the optical cavity by polarizing prism 13, this beam being a relatively small portion of the light pulse oscillating in the cavity. In addition, with Pockel cell 15 biased at quarterwave voltage, the light pulse indicated at 23 passes through Pockel cell 15 and is first linearly polarized perpendicular to the plane of the sheet of the paper, as indicated by the dots 32, reflected back through the cavity by etalon 18 and circularly polarized in the left circular (LC) direction as indicated at 23.

Figure 4:
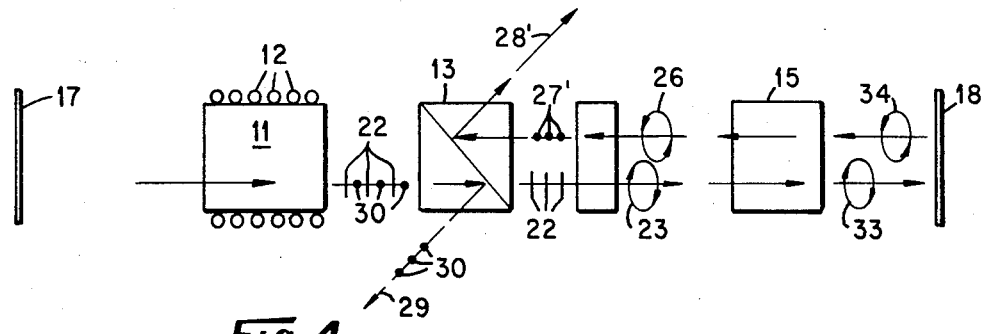
FIG. 4 schematically illustrates the light travel and polarization of an enlarged view of the optical cavity of the FIG. 1 apparatus with the Pockel cell biased at zero voltage.

FIG. 4 shows the polarization state of light transmitted through each element in the optical cavity of the FIG. 1 embodiment, with no (zero) voltage bias on the Pockel cell 15. As in the halfwave voltage operation illustrated in FIG. 2, the light returning to the polarizing means or prism 13 is linearly polarized perpendicular to the plane of the sheet of paper, as indicated by dots 27', and hence is reflected out of the optical cavity by prism 13, as indicated at 28'. Also, as in FIG. 2, incident light beams 29 having a linear polarization perpendicular to the plane of the sheet of paper, as indicated by dots 30, is reflected out of the optical cavity. The difference between the Pockel cell halfwave voltage operation illustrated in FIG. 2 and the zero voltage operation of FIG. 4 is in the circular polarization of the light pulse as it passes through Pockel cell 15 and reflected back to etalon 18. In the FIG. 2 showing the light pulse was converted to an RC polarization, indicated at 24, by Pockel cell 15 while here it passes through Pockel cell 15 in an LC polarization, indicated at 33; the pulse being reflected back by etalon 18 as a RC polarization, indicated at 34, while in FIG. 2 it was reflected back as an LC polarization, indicated at 25 with the Pockel cell converting it to an RC polarization, while in FIG. 4 the light passes through Pockel cell 15 without change of polarization since the cell 15 is at zero voltage.

A mode-locked, bandwidth-limited light pulse is obtained from the above-described laser oscillator system in the following manner: (1) the Pockel cell 15 is electrically biased by means 19 at its halfwave retardation potential, and the gain medium 11 is optically pumped to create a population inversion in the lasing species; and (2) the spark gap switching means 21 is triggered to short the electrical potential across the Pockel cell 15 to ground, thereby rapidly dropping the voltage impressed across the cell. As the voltage across Pockel cell 15 drops through its quarterwave retardation value, the laser cavity passes through an "on" condition wherein a pulse of light is allowed to pass back and forth through the rear of the cavity (elements 13, 14, 15, 18, 15, 14, 13) essentially unattenuated. Because of strain efforts on the Pockel cell crystal, the retardation induced by the Pockel cell 15 does not drop to exactly zero, but to a residual value $\Delta$ where it remains for several micro-seconds or longer. However, there will be some light transmission through the Pockel cell 15/quarterwave plate 14/polarizing prism 13 combination (referred to as the PQP) at zero bias voltage. To prevent self-oscillations in the cavity in this state, the quarterwave plate 14 can be rotated (or another cavity parameter adjusted) such that the light transmission through the cavity T ($\Delta$), when the Pockel cell 15 has a polarization retardation $\Delta$, satisfies the following relationship:

$$T(\Delta)\, R_1(w) R_2(w) G(w) \gtrless 1$$

(2)

where $R_1$ is the frequency-dependent reflection factor of etalon 18, $R_2$ is the frequency-dependent reflection factor of etalon 17, $T(\Delta)$ is the round trip internal transmission of the rear end of the cavity when the Pockel cell has a retardation equal to $\Delta$, and G is the gain factor of the active medium 11. The above adjustment assures that only the originally gated pulse will be allowed to oscillate in the cavity, and that the pulse will only contain frequency components which satisfy the transmission condition defined in the above equation. It should be noted that the higher the gain G of the gain medium 11, the closer to zero the transmission of the PQP-etalon combination can be, a factor which aids achieving bandwidth-limiting properties for the oscillating pulse.

Figure 5:
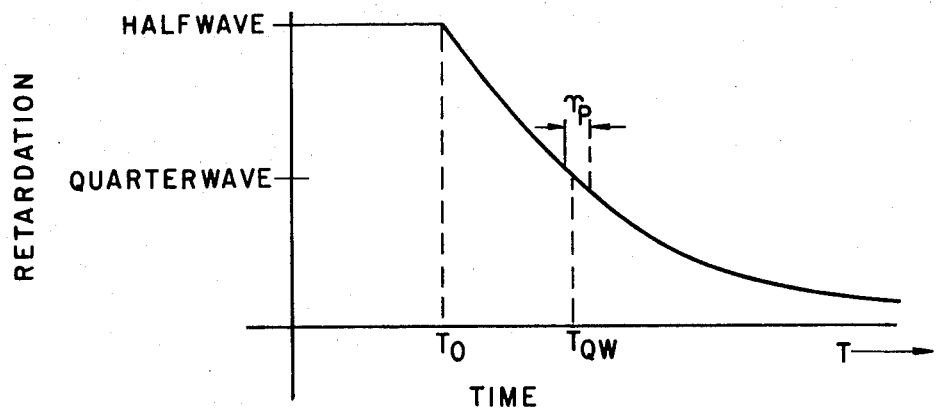
FIG. 5 graphically illustrates Pockel cell retardation vs time.

FIG. 5 shows a graph of the voltage impressed across the Pockel cell 15 as a function of time. Referring to FIG. 1, the high voltage switch 21 shorts the holding potential across the cell to ground at time $T_o$. The potential across the cell then begins to drop from the halfwave retardation value, and transmission increases through the PQP combination, reaching a maximum when the potential reaches the quarterwave retardation value for the Pockel cell. Transmission through the PQP switching combination then decreases as the retardation drops from the quarterwave value to the $\Delta$ retardation value. At $\Delta$, transmission through the optical cavity satisfies the above equation (2), thereby permitting continued oscillation of the gated pulse.

Figure 6:
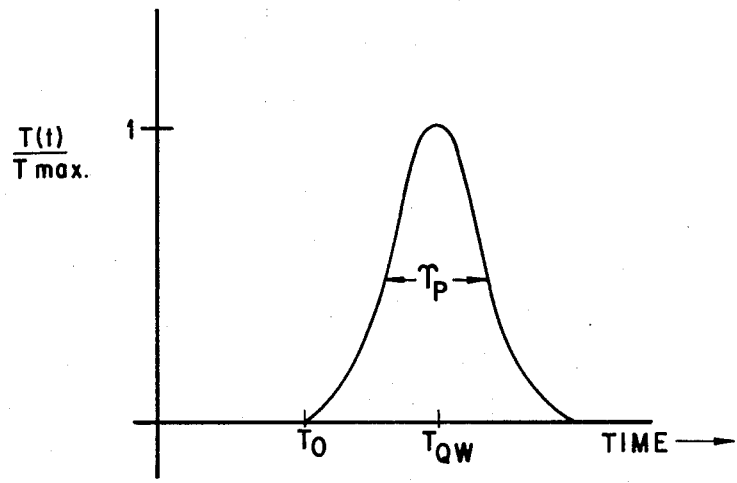
FIG. 6 graohically illustrates percentage transmission of PQP combination vs time.

FIG. 6 shows a graph of percentage transmission $T(t)/T_{max}$ through the PQP combination as a function of time. Mathematically, the transmission function of the PQP-etalon combination is given by the following relationship:

$$T = A_o \sin^2 K_o V$$

(3)

where T is the fraction of light transmitted by the combination, $A_o$ is a frequency-dependent coefficient ($\leq 1$), $K_o$ is a constant determined by the material characteristics of the Pockel cell and the oscillating wavelength, and V is the voltage applied across the Pockel cell. Accordingly, where the voltage across the Pockel cell is equal to the quarterwave retardation value, the following relationship results:

$$K_o V_{Qw} = \pi/2$$

(4)

where $V_{Qw}$ is the quarterwave retardation voltage.

The PQP-switched oscillator has the following important properties:

1. The cavity is switched when the voltage bias across the Pockel cell is sweeping through a quasi-linear range (around $V_{Qw}$), contrasting to conventional switching techniques, wherein the cavity switches with voltage bias across the Pockel cell in a nonlinear range (e.g., asymptotically approaching zero bias);

2. The PQP switch provides a time-symmetric transmission characteristic $T(t)$ (see FIG. 6), thereby opening and closing the oscillator cavity symmetrically in time. This feature is useful for providing time symmetrical pulses and/or pulse envelopes; and 3. The rate at which the potential drops across the Pockel cell can be varied by conventional electronic techniques, thereby making direct electronic control of the cavity switching time possible, a particularly important property for controlling pulse durations in high gain laser systems. (Electronic systems have been designed which can drop the voltage across the Pockel cell from its halfwave retardation value $V_{Hw}$ to zero in times which are variable between 0.24 to > 100 nsecs.)

Basically, the novel PQP switching technique of the inventive system induces oscillation of a large amplitude time symmetric light pulse consisting of stationary intra-cavity (random) noise produced in the optical cavity. The overall gain of the system, as the retardation across the Pockel cell drops to and remains at the $\Delta$ residual retardation value, permits continued oscillation and/or buildup of the allowed frequency components in the gated pulse until the population inversion excited in the in the gain medium is depleted sufficiently to reduce the round trip gain of the oscillator below unity. Hence, it is possible to vary the intensity of the oscillator output pulse or pulses, and still retain the essential operating features of the disclosed system by controlling the amount of inversion in the gain medium.

The frequency content of the oscillating light pulse is determined by the cavity elements, i.e., the frequency dependence implicit in equation 2 above with an upper bound (shortest time duration pulse) imposed by the gain-bandwidth properties of the gain medium. If the optical cavity is defined by multiple-face resonantly reflecting etalons, frequency content of the pulses is restricted to particular narrow frequency ranges. However, it is important to point out that the degrees of frequency, mode selection, and subsequent mode-locking achieved in the system can also be varied by choosing appropriate cavity elements. For example, the cavity can be reduced to single frequency operation by temperature-tuning the two etalons, or by adding other cavity elements to provide incommensurate spacings at all but one frequency. The resultant pulse resembles a Q-switched pulse, and has had a duration as long as 400 nsecs.

If more frequency modes are allowed to oscillate in the cavity, the pulse duration can be shorter. In this instance, a short pulse is switched into the oscillator. That pulse continues to buildup as long as its round trip gain exceeds unity. Accordingly, each time the pulse strikes the partially transmitting front etalon 17, a fraction of the pulse is transmitted, resulting in a series or "train" of output pulses. The spatial extent of the introduced pulse in this case is less than the cavity length, i.e., two or more cavity longitudinal modes are oscillating in phase.

The resultant pulse or pulses produced in either the single frequency or multi-frequency mode are bandwidth-limited, i.e., $$\Delta w = K/\Delta t$$

where $\Delta w$ is the bandwidth or frequency content of the output pulse, $\Delta t$ is the time duration of the pulse, and K is a constant on the order of unity. The exact value of K is dependent on the pulse shape. The invented system produces pulses having limited bandwidth because control of the pulse frequency content is independent of the control over the pulse duration.

The switching technique described above for the inventive oscillator system can also be applied outside of the oscillator cavity to select and/or control the duration of an output pulse from a laser. In general, the pulse-switching unit (PSU) comprises a series of Pockel cells aligned between two polarizers — all connected to a common high voltage switch. The Pockel cells are electrically biased at a retardation potential (Ve) equal to the "full wave" retardation value of the cells ($V_{fw}$) divided by the number of Pockel cells in the switching series ($n$), i.e., $$V = V_{fw}/N$$

(6)

Figure 7:
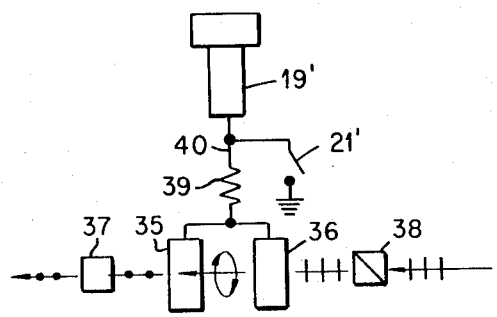
FIG. 7 schematically illustrates another embodiment of the pulse-switching unit (PSU) of the inventive laser oscillator.

FIG. 7 illustrates a schematic for a PSU consisting of two Pockel cells 35 and 36 placed between two polarizing prisms 37 and 38. The combination of elements 35–38 is aligned with an optical axis of a laser oscillator cavity similar to that of the FIG. 1 embodiment. In the FIG. 7 embodiment, the voltage across the Pockel cells will equal their halfwave retardation value. Each Pockel cell is connected through a dropping resistor 39 to a common delay cable 40 which is supplied with power from a power supply means 19', as in the FIG. 1 embodiment, and also connected through a high voltage switch 21' to ground. Upon triggering the high voltage switch 21', the Pockel cell pair/polarizing prism combination (elements 35–38) defines a temporarily symmetric transmission window similar to that graphically illustrated in FIG. 6. The time duration of this thus formed transmission window may be continuously adjusted by electronically controlling the dropping rate of the potential across the Pockel cells 35 and 36. The external PSU of FIG. 7 can be activated with a resolution to 0.1 nsec. with respect to an incoming pulse, if synchronized with switching elements inside the oscillator cavity, e.g., the internal Pockel cell 15 of FIG. 1. The minimum transmission window duration of the FIG. 7 PSU achieved to date is on the order of 0.25 nsec.

A pulse transmitted by the external PSU of FIG. 7 can retain bandwidth-limited characteristics, if the input pulse is bandwidth-limited, i.e.:

$$\Delta w = K^1/\tau_p$$

where $\Delta w$ is the frequency bandwidth of the transmitted pulse, $K^1$ is a constant on the order of unity, and $\tau_p$ is the time duration of the transmission window defined by the PSU unit and if the electrical shorting pulse is correctly shaped, thus, the external switch of FIG. 7 can have the same important properties as the above described PQP switch inside the laser cavity of FIG. 1. Accordingly, it is possible to reliably produce bandwidth limited light pulses whose time duration can be continuously varied from approximately 0.25 nsec. to $>$ 100 nsecs. with the combination of the PQP laser oscillator and the external PSU.

Figure 8:
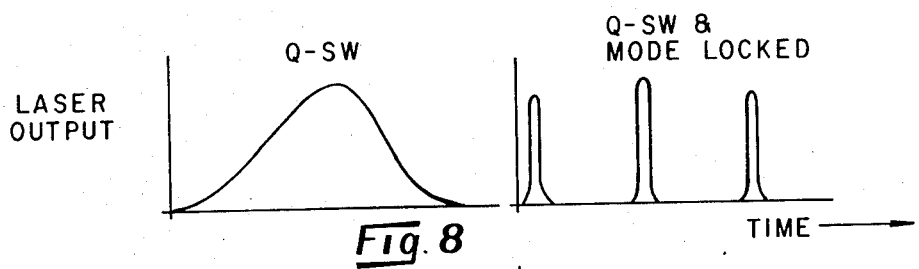
FIGS. 8, 9 and 10 graohically illustrates Q-switched and Q-switched/mode-locked waveforms for the PSU.
Figure 9:
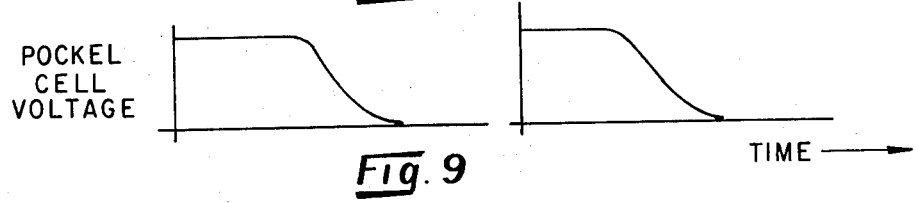
Figure 10:
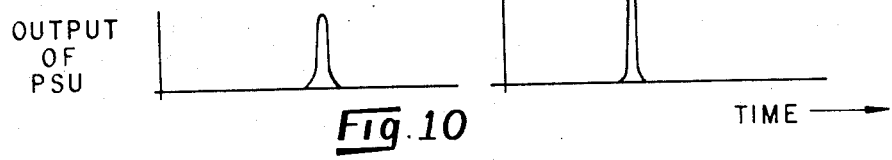

FIGS. 8–10 graphically illustrate waveforms for the PSU of FIG. 7 for Q-switched and the Q-switched/mode-locked bandwidth-limited pulses. FIG. 8 illustrates laser output vs time, with Pockel cell voltage vs time shown in FIG. 9, and output of the PSU vs time in FIG. 10.

Feasibility for the inventive self-driven oscillator has been demonstrated in a Nd:YAG system containing a PQP element in an optical cavity defined by a four element resonantly-reflecting ($R=99$ percent) rear etalon and a two element resonantly-reflecting ($R=66$ percent) front etalon. Total energy input to the helical lamp head containing a ¼×3 inch flat-flat AR coated rod was ~100 joules, resulting in output energies of nominally 0.25 mj/pulse for a 5 mj mode-locked pulse train as determined by a calibrated radiometer (EG&G Model 580) system. The spectral content of the pulses was measured with a Fabry-Perot interferometer. Temporal behavior was monitored by an ITT F-4014 photodiode in conjunction with a Tektronix Type 519 cathode ray oscilloscope. The output pulses in these tests consisted of 2–3 adjacent axial modes (limited by interferometer resolution) of the ~/m optical cavity, and corresponding were 2.5 nsec. in duration (FWHM), in agreement with the inverse frequency bandwidth, i.e., bandwidth-limited outputs are obtained from the system. By providing alternate mode selecting components in the oscillator and adjusting the inversion it was found possible to vary the frequency bandwidth of the cavity feedback in order to tune the time duration of the output pulses. By utilizing various combinations of flat reflectors and etalons, bandwidth-limited pulses of 0.5 to 2.5 nsec. and $>$ 100 nsec. duration were obtained in tests conducted with the inventive system.

It has thus been shown that the present invention provides a laser oscillator for producing relatively long duration Q-switched or Q-switched/mode-locked bandwidth-limited pulses. The oscillator is self-driven, wherein a large pulse of noise light of adjustable duration is allowed to buildup by means of controlled bandwidth feedback in the optical cavity. A synchronized, pulsed switching means external to the oscillator cavity provides bandwidth-limited pulses of "tunable" durations ranging between 0.25 nsec. and 100 nsec.

While particular embodiments of the invention have been illustrated and described, modifications and change will become apparent to those skilled in the art, and it is intended to cover in the appended claims all such modifications and changes as come within the spirit and scope of the invention.

What we claim is:

1. A laser oscillator for producing Q-switched or Q-switched and mode-locked bandwidth-limited pulses comprising: an optical cavity defined by a pair of spaced frequency selecting reflective means, gain medium located within said optical cavity, means for pumping said gain medium, polarizing means located within said cavity intermediate said gain medium and one of said reflective means, quarterwave plate means located within said cavity intermediate said polarizing means and said one of said reflective means, and Pockel cell means positioned within said cavity intermediate said quarterwave plate means and said one of said reflective means; means for impressing a biasing electrical potential across said Pockel cell means; and switching means for shorting the Pockel cell means biasing potential to ground; whereby a large amplitude light noise pulse having a spatial extent less than the length of said optical cavity and an envelope symmetric about its intensity maximum is initiated in the cavity as said biasing potential is shorted to ground.

2. The oscillator defined in claim 1, wherein at least one of said pair of frequency selecting reflective means is a multiple-face, resonantly reflecting etalon.

3. The oscillator defined in claim 1, additionally including a dye cell means positioned intermediate said gain medium and the other of said pair of spaced frequency selecting reflective means.

4. The oscillator defined in claim 1, wherein said polarizing means comprises a polarizing prism.

5. The oscillator defined in claim 1, wherein said switching means comprises a spark gap switch means.

6. The oscillator defined in claim 1, wherein said gain medium is selected from the group consisting of ruby, neodymium: YAG, neodymium: glass, $CO_2$ and organic dye.

7. The oscillator defined in claim 1, wherein each of said pair of spaced frequency selecting reflective means comprises a multi-face, resonantly reflecting etalon.

8. The oscillator defined in claim 1, additionally including a pulse-switching means located externally of said optical cavity and aligned with an optical axis of said optical cavity for selecting and controlling the duration of an output pulse therefrom.

9. The oscillator defined in claim 8, wherein said pulse-switching means comprises a plurality of Pockel cells positioned intermediate a pair of polarizing prisms, each of said Pockel cells being connected to means for impressing a biasing electrical potential thereacross through a variable length delay line means, and a high voltage spark gap switch means being connected intermediate said Pockel cells and said delay line means.

* * * * *